United States Patent [19]

Satoh et al.

[11] Patent Number: 4,750,048
[45] Date of Patent: Jun. 7, 1988

[54] IMAGE READING DEVICE

[75] Inventors: Mamoru Satoh; Shizuo Hasegawa, both of Tokyo, Japan

[73] Assignee: Canon Kabushiki Kaisha, Tokyo, Japan

[21] Appl. No.: 848,293

[22] Filed: Apr. 4, 1986

[30] Foreign Application Priority Data

Apr. 9, 1985 [JP] Japan ................................. 60-75918

[51] Int. Cl.⁴ ............................................. H04N 1/40
[52] U.S. Cl. ................................... 358/287; 358/293; 358/294
[58] Field of Search ............... 358/287, 293, 285, 280, 358/256, 294; 382/62

[56] References Cited

U.S. PATENT DOCUMENTS 4,366,508 12/1982 Cream et al. ......................... 358/287
4,439,790 3/1984 Yoshida ............................... 358/287
4,506,301 3/1985 Kingsley et al. ..................... 358/287

Primary Examiner—Edward L. Coles, Sr.
Attorney, Agent, or Firm—Fitzpatrick, Cella, Harper & Scinto

[57] ABSTRACT

There is disclosed a long image sensor composed of plural linear image sensors arranged in staggered manner. The plural sensors are independently controlled in timing, thus achieving a larger freedom in the arrangement in the main and sub scanning directions.

15 Claims, 12 Drawing Sheets

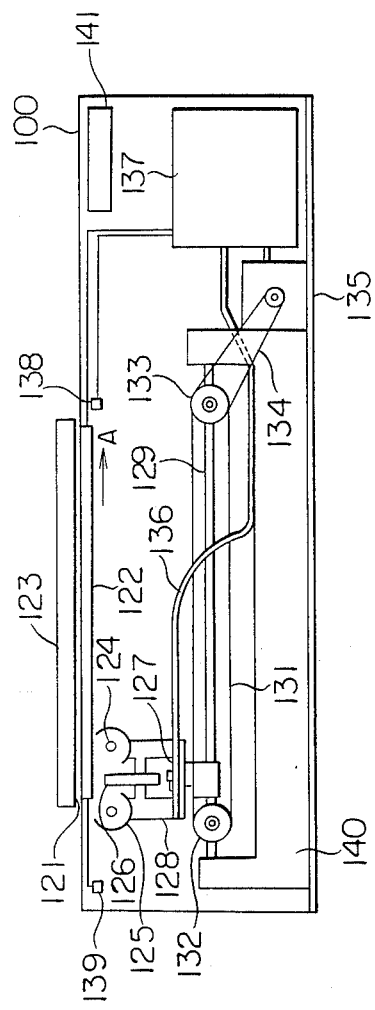
FIG. 5
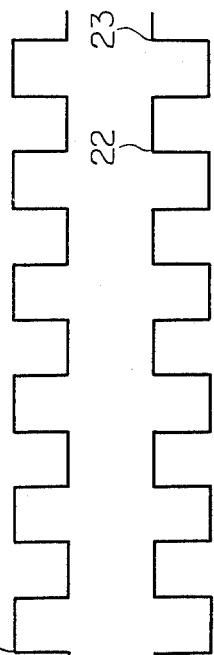
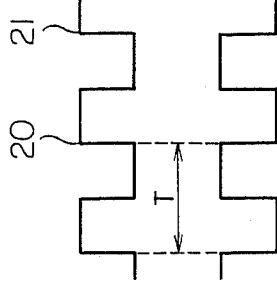
FIG. 6
(A) SAMPLING PULSES
(B) SAMPLING PULSES
(C) EXPOSURE TIMING
(D) EXPOSURE TIMING

IMAGE READING DEVICE

BACKGROUND OF THE INVENTION

1. Field of the Invention

The present invention relates to an image reading device for reading an original image by relative movement of an original document and plural linear image sensors.

2. Related Background Art

There has already been proposed an image reading device in which plural linear image sensors are arranged along the main scanning direction thereof to constitute a long sensor. FIG. 1 shows an example of such an image reading device, composed of linear image sensors 1, 2, each of which has a linear array of plural photosensor elements. Three image sensors 1 are arranged on a line 1' on a substrate S, while two image sensors 2 are arranged on a different line 2'. The distance l between the lines 1' and 2' is generally selected as a multiple of the product of the scanning speed V in the sub-scanning direction of the image sensors or a direction substantially perpendicular to the direction of arrangement of said sensors, and the sampling interval T.

Such an image reading device makes possible high-speed image reading and compactization of apparatus utilizing such device.

FIG. 2 shows the mode of image reading with the image reading device shown in FIG. 1, and FIG. 3 shows the timing of such image reading. In FIG. 2, 4 indicates an image to be read, and oblong rectangular solid-lined areas 5, 6 indicate images corresponding to trains of pixels sampled at a point 11 shown in FIG. 3. Also, oblong rectangular broken-lined areas 7, 8 are images corresponding to trains of pixels sampled at a time 12 in FIG. 3. In the present example it is assumed that the distance l between the image sensors 1 and the image sensors 2 is equal to 5 times the product of the sub-scanning speed V and the sampling interval T. The image areas 6 sampled at the timing 11 shown in FIG. 3 can construct a continuous main scanning line on the image, in combination with the image areas 7 sampled at the time 12 which is 5 cycles later, and such construction is possible because the distance of the lines of image sensors is an integral multiple (5 times in this example) of the product of the sub-scanning speed V and the sampling interval T.

For the purpose of comparison, FIG. 4 shows a case in which the distance l of the lines of image sensors is 5.5 times of the product of the subs-scanning speed V and the sampling interval T. In the structure shown in FIG. 4, if the image sensors 1, 2 are operated with the same sampling pulses, the solid-lined image areas 6 are not in line with areas 7 sampled 5 cycles later (timing 12) nor with areas 9 sampled 6 cycles later (timing 13).

As explained above, such a staggered arrangement of linear image sensors is associated with a drawback of limitation in the scanning speed and the sampling interval depending on the distance of image sensors. Such drawback is not limited to the staggered arrangement as shown in FIG. 1 but appears in any arrangement in which plural linear image sensors are placed with a determined distance between them in the sub-scanning direction.

SUMMARY OF THE INVENTION

In consideration of the foregoing, an object of the present invention is to provide an image reading device capable of image reading with a high resolving power and with an arbitrary image magnification.

Another object of the present invention is to provide a compact image reading device with a high resolving power.

Still another object of the present invention is to provide an image reading device capable of reading a color image with a simple structure.

Still another object of the present invention is to provide an image reading device for reading an original image by relative movement of an original document and plural linear image sensors, wherein said plural linear image sensors are arranged with a determined distance in the direction of said relative movement and said plural linear image sensors are independently controlled in timing.

The foregoing and still other objects of the present invention, and the advantages thereof, will become fully apparent from the following description.

BRIEF DESCRIPTION OF THE DRAWINGS

FIG. 5 is a schematic view of a reader unit embodying the present invention;

FIG. 6 is a view of sampling areas according to the present invention on an original image;

DETAILED DESCRIPTION OF THE PREFERRED EMBODIMENTS

Now the present invention will be clarified in detail by reference to the preferred embodiments thereof.

Figure 1:
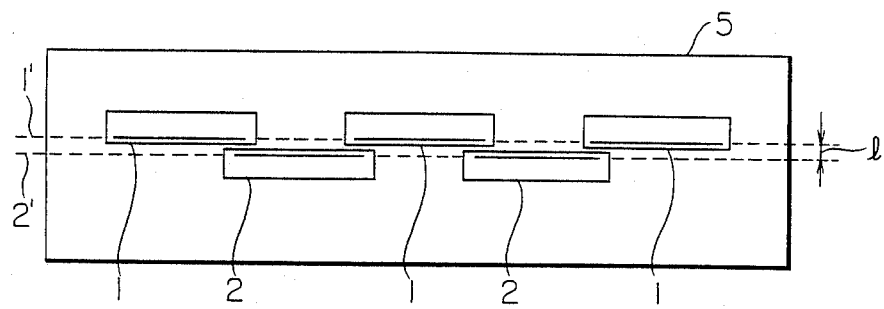
FIG. 1 is a view of an example of staggered arrangement of linear image sensors.
Figure 2:
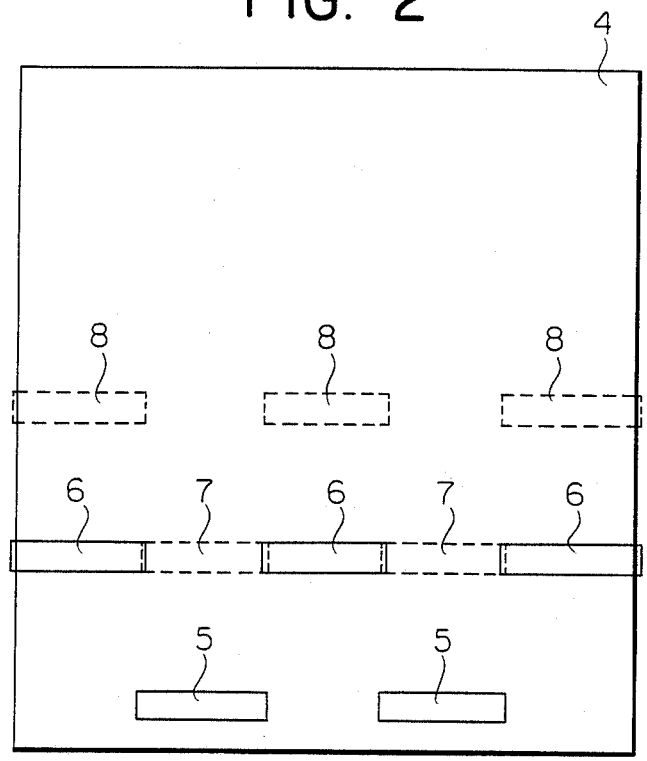
FIGS. 2 and 4 are views showing sampling areas with said sensors moving on an original image.
Figure 3:
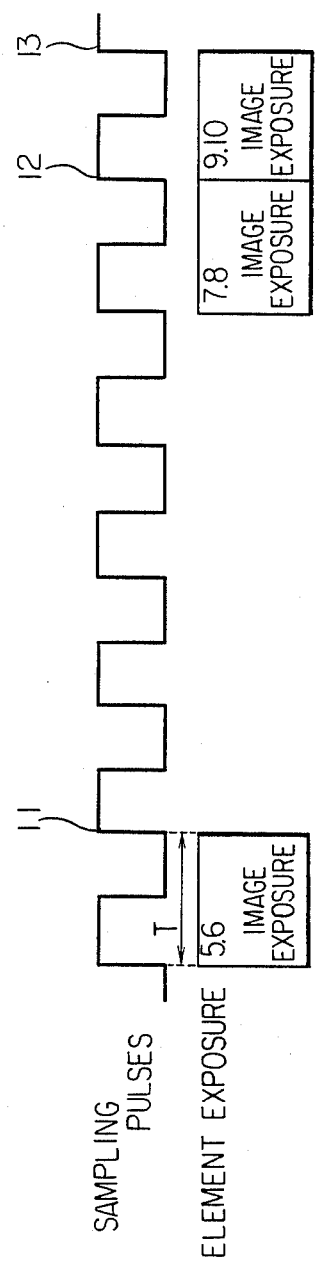
FIG. 3 is a timing chart showing the timing of sampling.
Figure 4:
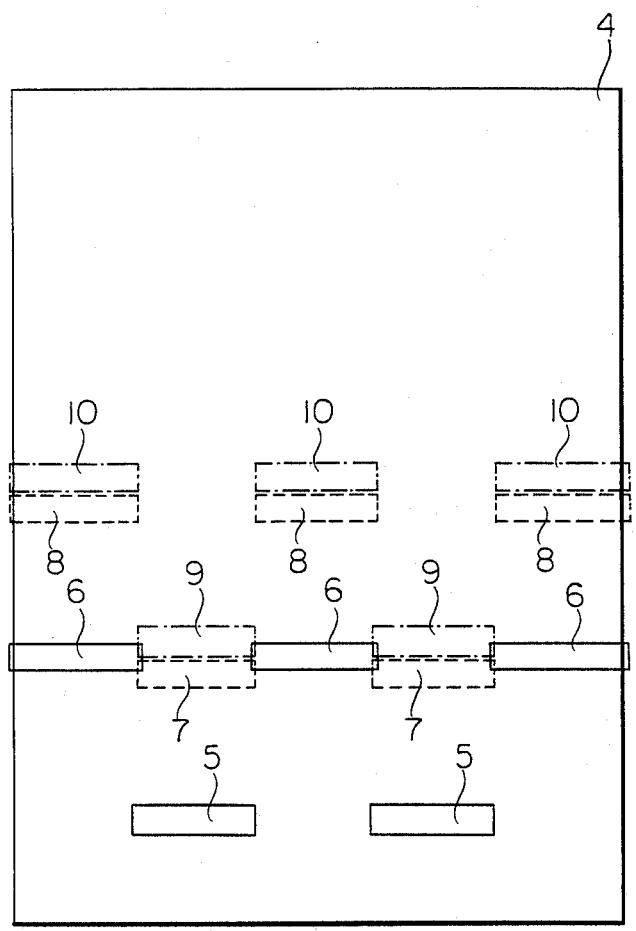

FIG. 5 shows the structure of an image reader unit 100 embodying the present invention, in which are shown an original 121; a transparent support glass 122 for supporting said original; an original cover 123; a lamp 124 for illuminating said original; a mirror 125 for effectively guiding the light of said lamp to the original; a short-focus imaging lens 126 for guiding the light from the original; an image reading device 127 shown in FIG. 1, composed of CCD sensors, for converting a light image focused by the lens 126 into electrical signals; a reciprocating sensor support 128 supporting the illuminating lamp 124, mirror 125, lens 126 and CCD line sensors 127; a shaft 129 supporting said sensor support 128; a fixed support 140 supporting said shaft; a belt 131 for transmitting a reciprocating force to the sensor support; a pulley 132 for driving said belt 131; a driving pulley 133 for supporting said belt 131; a driving belt 134 connecting the pulley 133 with a driving motor 135; and a cable 136 for guiding the output signals from the CCD sensors 127.

There are further provided a control process unit 137 for controlling the output of the CCD line sensors 127 and the function of the illuminating lamp 124 and of the motor 135; a forward limit switch 138 to be actuated by the sensor support 128; a home position sensor 139 for said sensor support 128; and an operation panel 141 for the entry of copying instruction, reading image magnification etc.

In the following there will be explained the function of the reader unit. In response to a copying instruction entered from the operation panel 141, the control unit 137 releases a signal to light the illuminating lamp 124 and to rotate the motor 125 in the forward direction, whereby the sensor support 128 is moved in a direction A. Thus the original 121 is read line by line, by the CCD line sensors 127 moved in the sub-scanning direction and converted into electrical signals. At the end of forward movement, the sensor support 128 actuates the forward limit switch 138, whereby the motor 135 is reversed to start the reverse movement of the sensor support 128. When the home position sensor 129 is actuated, the motor 135 is stopped and the sensor support 128 is stopped at a home position.

Figure 7:
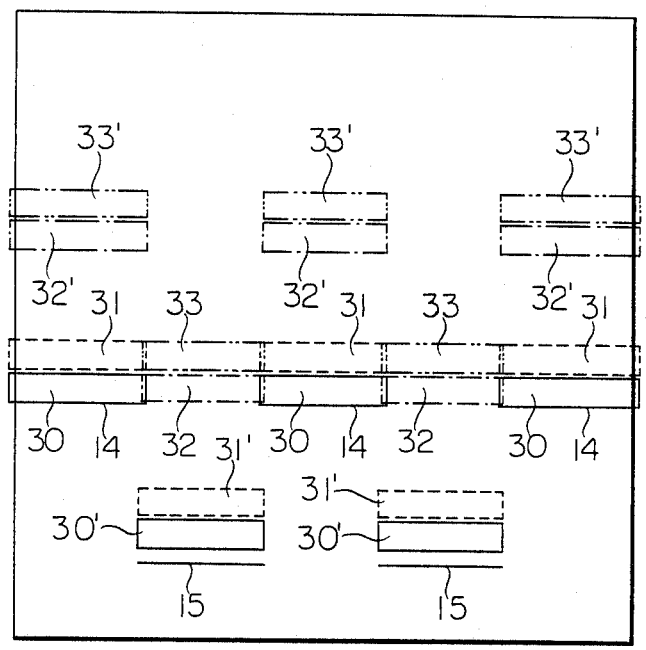
FIG. 7 is a chart showing the timing of sampling.

FIG. 6 is a timing chart showing the timing of sampling pulses, and FIG. 7 shows the image reading areas of the sensors at the timing shown in FIG. 6. In FIG. 6, (A) indicates sampling pulses supplied to the sensors 1 shown in FIG. 1, while (B) indicates those supplied to the sensors 2. (C) shows the image areas scanned by said sensors 1, and (D) shows those scanned by said sensors 2, wherein the image areas 30-33, 31'-33' respectively correspond to the areas of same numbers shown in FIG. 7. In FIG. 7, lines 14, 15 indicate the positional relationship of the image sensors, wherein the distance l of the lines of image sensors is equal to 5.5 times the product of the scanning speed V and the sampling interval T. The waveforms (A) and (B) are mutually displaced by 180°, and this relationship is represented by Frac (X)×360°, wherein X stands for the distance l between the sensors divided by the product of the sub-scanning speed V and the sampling interval T, and Frac (X) represents the fractional part of X.

In this structure, the image areas 30 are sampled by the image sensors 1 at a timing 20. The image areas 32 on the same line as said image areas 30 are sampled by the image sensors 2 at a timing 22. Similarly the image areas 31 sampled at a timing 21 are on the same line as the image areas 33 sampled at a timing 23.

In this manner the aforementioned limitation in the scanning speed V and the sampling interval T in relation to the distance of two lines of image sensors can be avoided by varying the timing of sampling of respective lines of the image sensors. Stated differently, a change in phase of the sampling pulses supplied to two lines of image sensors allows image reading with arbitrary scanning speed and sampling interval, and without aberration in the image reading positions of two lines of the image sensors.

The above-mentioned freedom in the scanning speed and sampling interval allows one arbitrarily to modify the image magnification in the sub-scanning direction at image reading.

In the following there will be explained such modification in image magnification. For the purpose of explanation, the image reading apparatus is assumed to have a structure shown in FIG. 8, wherein a first line of image sensors 110 and a second line of image sensors 120 respectively read 3/5 and 2/5 of the area in the main scanning direction and release image signals VD1, VD2 indicating the density of the image.

In the following there will be explained the method of modifying the image magnification in the sub-scanning direction. Such modification of image magnification in the main scanning direction can be achieved by suitably skipping or expanding the serial image signals of each line in the already known manner and will therefore not explained in detail.

Figure 8:
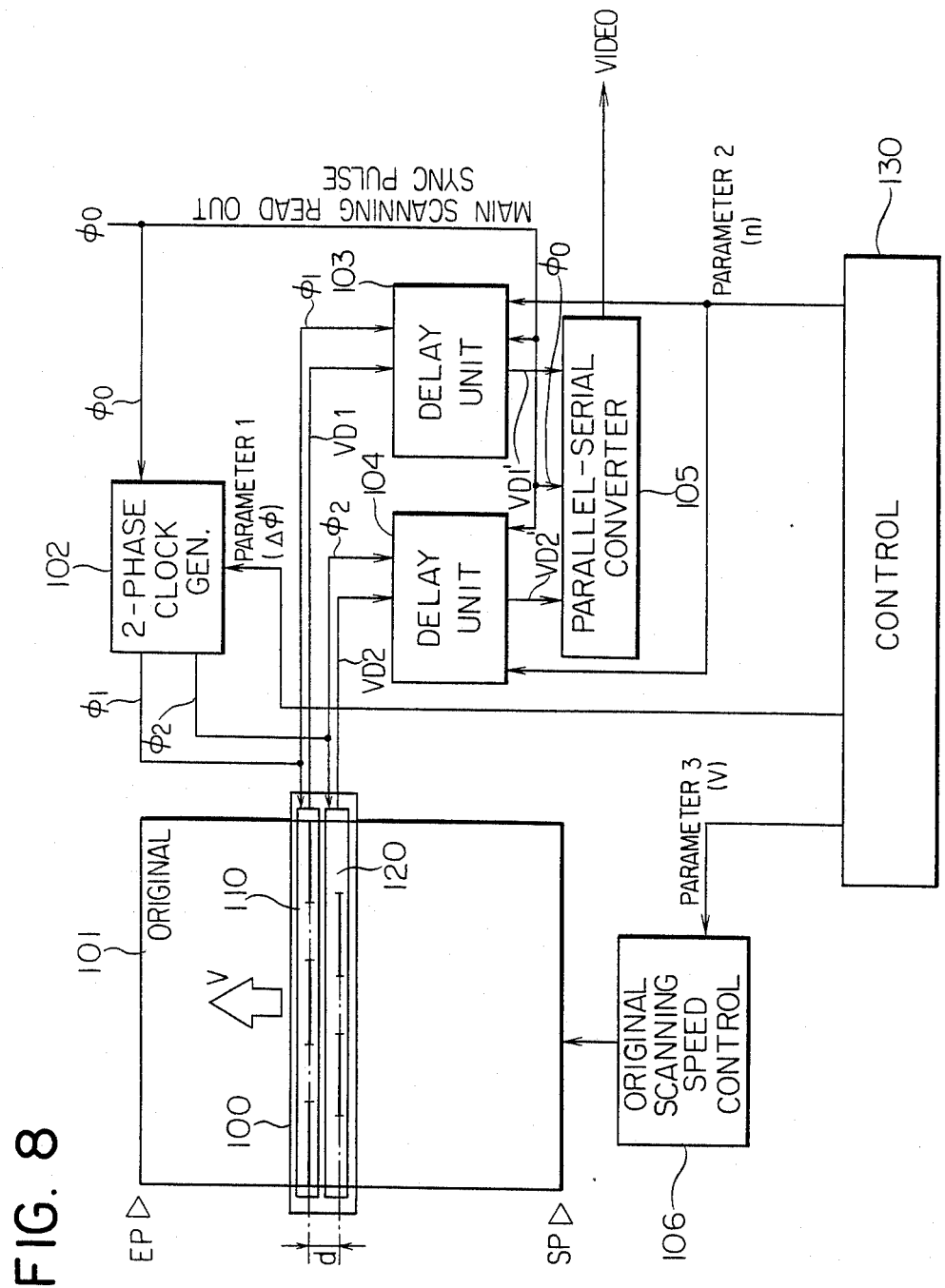
FIG. 8 is a block diagram of a reading control unit according to the present invention.

In FIG. 8, an image reading unit 100 is composed of five line image sensors which are arranged in staggered manner in two lines 110, 120 separated by a distance d, and is moved from a position SP to another position EP in a direction indicated by an arrow, with a relative speed V controlled by a scanning speed control unit 106 according to the image reading magnification, thereby scanning an original 101 in the sub-scanning direction. The moving mechanism for said linear image reading unit 100 can be composed in the known manner, as shown in FIG. 5, of the motor 135, belts 131, 134, pulleys 132, 133 etc.

Figure 9:
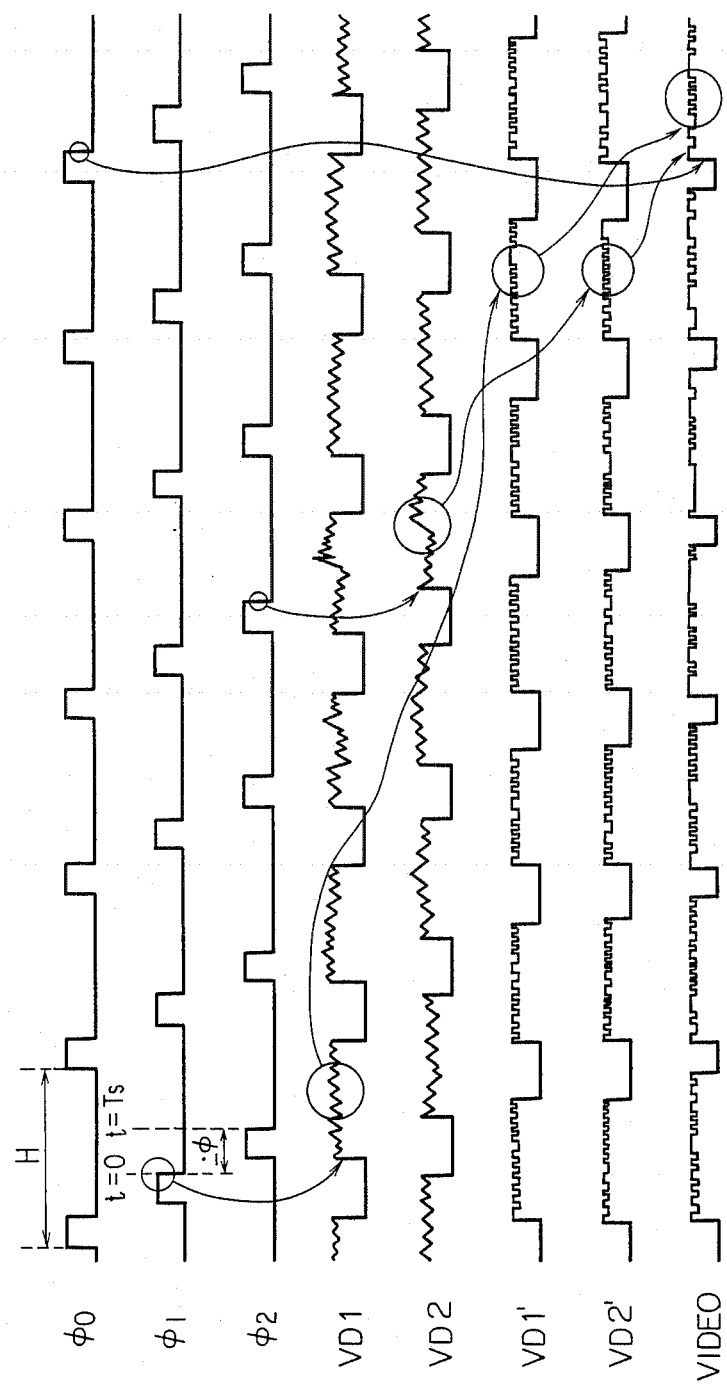
FIG. 9 is a timing chart showing the function of the circuit shown in FIG. 8.

Sampling pulses $\phi 1$, $\phi 2$ supplied to the lines of image sensors 110, 120 are generated, with a phase differece corresponding to the image reading magnification, by a 2-phase clock generator 102, from original pulses $\phi 0$. The image signals VD1 read by the image sensors 110 are sampled by the clock pulses $\phi 1$ and supplied to an A/D and sample delay unit 103 with a variable delay, thus delayed or buffered therein by a suitable number of main scanning cycles corresponding to the image reading magnification. Similarly the image signals VD2 read by the image sensors 120 are sampled by the clock signals $\phi 2$ and supplied to an A/D and sample delay unit 104 of a variable delay with plural line buffers, thus delayed therein by a suitable number of main scanning cycles corresponding to the image reading magnification. Image signals VD1', VD2' suitably delayed by said delay units 103, 104 are converted, by a parallel-to-serial converter 105, into serial main scanning data VIDEO and supplied to following processing units such as a printer or a memory. FIG. 9 is a corresponding timing chart.

In the following are explained the parameters in FIGS. 8 and 9. In the example illustrated in FIG. 8, the original pulses $\phi 0$ have a constant interval, and the serial main scanning data VIDEO are released from the parallel-to-serial converter 105 at a constant rate, in synchronization with said original pulses $\phi 0$. Let us consider a case that a main scanning line sampled by the image sensors 110 by a sampling pulse $\phi 1(t=0)$ is also sampled by the image sensors 120 by a sampling pulse $\phi$ (t=Ts). For an interval H of the original pulses $\phi 0$ and a phase difference $\delta$ of the sampling pulses $\phi 1$ and $\phi 2$ there can be obtained relations:

$$Ts = nH + \Delta\phi/360 \times H \quad (n: \text{integer larger than } 0)$$

$$d/v = nH + \Delta\phi/360 \times H$$

$$d/vH = n + \Delta\phi/360$$

so that $$\Delta\phi = 360° \times Frac(d/vH) \quad (1)$$

wherein Frac(X) is a function indicating the fractional part of X.

On the other hand, there can be obtained a relation:

$$v = 1/(\alpha v_0) \quad (2)$$

wherein $\alpha$ is the image reading magnification in the sub-scanning direction, and the scanning speed v is $v_0$ when $\alpha = 1$, i.e. reading in the same size.

From the equations (1) and (2):

$$\Delta\phi = 360° \times Frac(\alpha \cdot d/v_0 H) \quad (3)$$

Also, when the delay units 103, 104 respectively cause delays of $n_1$ and $n_2$ main scanning lines with a difference n, there is obtained a relation:

$$n = int(d/vH) = int(\alpha \cdot d/v_0 \cdot H) \quad (4)$$

wherein int(X) indicates a maximum integer not exceeding X. The relation of $\phi 1$ and $\phi 0$, and the relation of $n_1$ and n are determined in the actual circuit structure.

The foregoing equations (2), (3) and (4) allow to determine three parameters shown in FIG. 9, i.e. the phase difference $\Delta\phi$ (parameter 1), amount of delay n (parameter 2) and speed v (parameter 3) from the image magnification $\alpha$ in the sub-scanning direction. These parameters are calculated, by a control unit 130 utilizing a microcomputer, from the image magnification $\alpha$ entered from an operation panel 141, and are transmitted to various units shown in FIG. 8. The above-explained example provides freedom in the relation of $\phi 0$, $n_1$ and n, in the relation of $\phi 0$ and $\phi 1$ and in $v_0$, and these can be suitably selected according to the performance of components constituting the image reading device. In this manner the sub-scanning speed v and the timings $\phi 1$, $\phi 2$ of the sampling of image sensors are independently controlled according to the desired image magnification $\alpha$ in the sub-scanning direction. In this manner it is rendered possible, with an image reading device with a staggered arrangement of plural image sensors, to read an image with an arbitrary image magnification, without aberration in the reading positions of the image sensors in the first and second lines.

Figure 10:
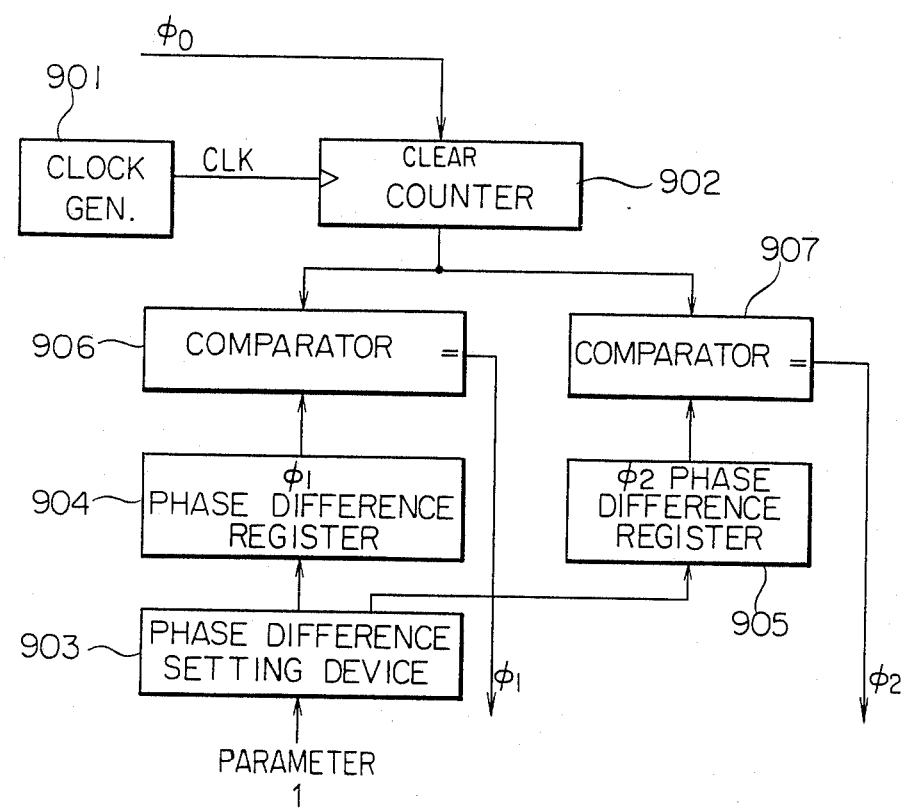
FIG. 10 is a block diagram showing an example of a 2-phase generator.
Figure 11:
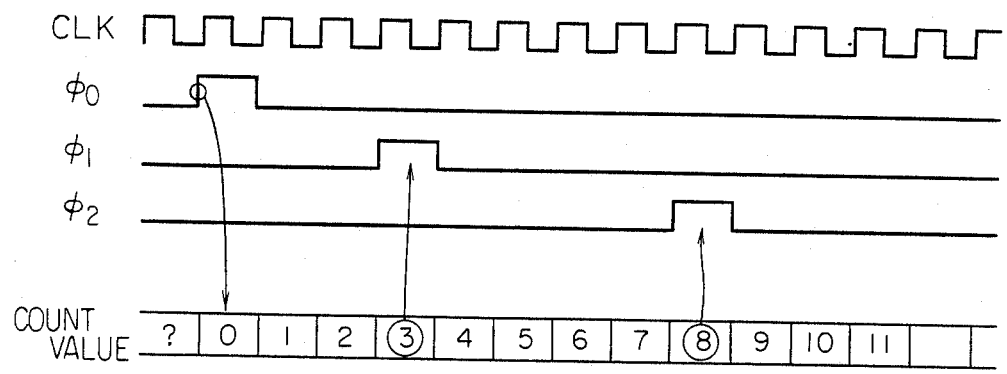
FIG. 11 is a timing chart showing the function of the circuit shown in FIG. 10.

FIG. 10 shows the details of the 2-phase clock generator shown in FIG. 8, and FIG. 11 shows a corresponding timing chart.

In FIG. 10, a clock generator 901, composed of a crystal oscillator for generating clock pulses CLK of a frequency higher than that of the original pulses $\phi 0$, and said oscillation frequency is determined in advance according to an arbitrarily required image reading magnification. The clock pulses CLK from said clock generator 901 are supplied to a counter 902, which is cleared by the entry of an original pulse $\phi$ and counts the clock pulses CLK entered from the clock generator 901.

A phase difference setter 903 releases the timings of generating the sampling pulses $\phi 1$, $\phi 2$ converted into the number of clock pulses from the clock generator 901, in response to the parameter 1 supplied from the control unit 130, or the phase difference $\Delta\phi$ of the sampling pulses $\phi 1$ and $\phi 2$ corresponding to the image magnification. The data of phase difference converted by the phase difference setter 903 are set in a $\phi 1$ phase difference register 904 and a $\phi 2$ phase difference register 905.

FIG. 11 shows a case in which the phase difference data of the sampling pulses $\phi 1$, $\phi 2$ are respectively converted as 3 and 8 by the phase difference setting 903.

The count of the aforementioned counter 902, which is cleared by an original pulse $\phi 0$ and counts the clock pulses CLK, is supplied to comparators 906, 907. The comparator 906, also receiving the set value of the $\phi 1$ phase difference register 904, releases a sampling pulse $\phi 1$ when said set value coincides with said count. On the other hand, the comparator, also receiving the set value of the $\phi 2$ phase difference register 905, releases a sampling pulse $\phi 2$ when said set value conincides with said count of the counter 902.

Figure 12:
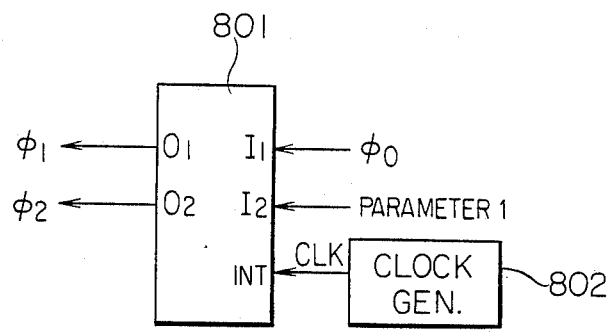
FIG. 12 is a block diagram showing another example of the 2-phase generator.
Figure 13:
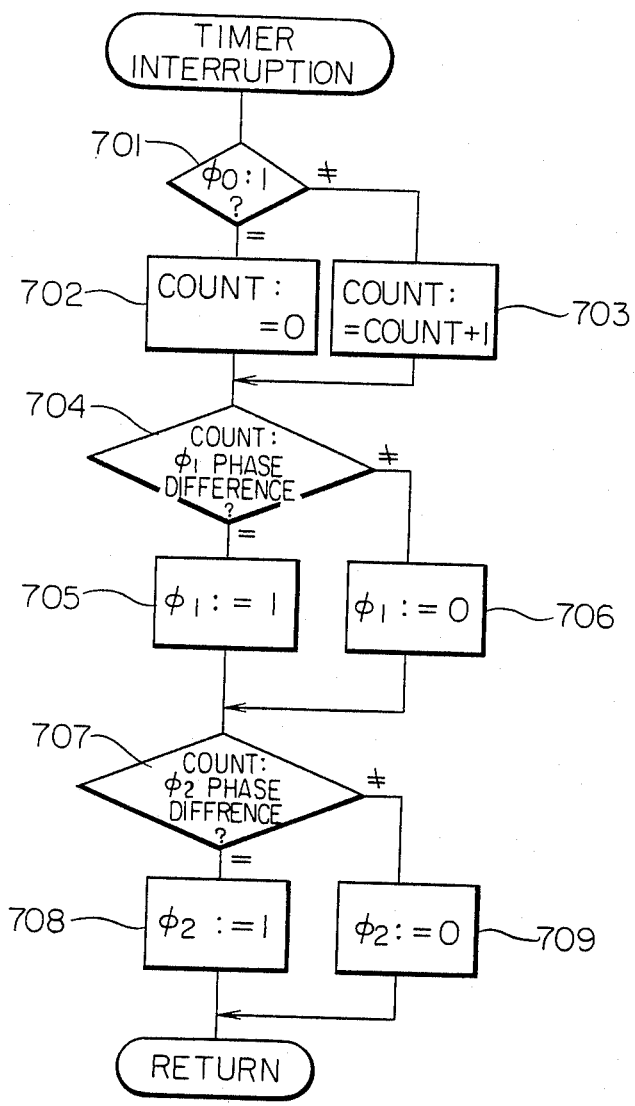
FIG. 13 is a flow chart showing the control sequence of a microcomputer shown in FIG. 12.

FIG. 12 shows a circuit structure in case the 2-phase clock generator 102 shown in FIG. 8 is composed of a usual microcomputer, and FIG. 13 is a flow chart showing the procedure of generating the sampling pulses $\phi 1$, $\phi 2$. A progam represented by said flow chart is stored in a read-only memory of said microcomputer.

In FIG. 12, a known microcomputer 801 receives, at an interruption port INT, clock signals CLK supplied from a clock generator 802 similar to that shown in FIG. 10, and executes a timer interruption procedure in response to a clock pulse CLK to said interruption port INT. Also the microcomputer 801 receives the original pulses $\phi 0$ and the parameter 1 respectively at an input port I1 and another input port I2.

In the same manner as the phase difference setter 903 shown in FIG. 10, the microcomputer 801 converts, in response to the parameter 1 received at the input port I2, the timings of generation of the sampling pulses $\phi 1$, $\phi 2$ into the numbers of clock pulses CLK and retains thus obtained phase difference data in a RAM.

In response to a clock signal CLK entered to the interruption port INT for a timer interruption, a step 701 identifies whether an original pulse $\phi 0$ has been entered, and, if entered, a step 702 clears a count area of the RAM. On the other hand, if said original pulse $\phi 0$ has not been entered, a step 703 executes an increment of the count of said count area. In this manner the number of entered clock pulses CLK can be counted from the entry of the original pulse $\phi 0$.

Then a step 704 identifies whether the count of the count area is equal to the phase difference data of the sampling pulse $\phi 1$ stored in advance in the RAM, and, if equal, a step 705 shifts an output port O1 to a high level state, thus releasing the sampling pulse $\phi 1$. On the other hand, if they are not equal, a step 706 shifts the output port O1 to a low level state. In this manner the sampling pulse $\phi 1$ can be generated when the count of the count area becomes equal to the phase difference data of the sampling pulse $\phi 1$.

Then a step 707 identifies whether the count of the count area is equal to the phase difference data of the sampling pulse $\phi 2$ stored in advance in the RAM, and, if equal, a step 708 shifts an output port O2 to a high level state, thus releasing the sampling pulse $\phi 2$. On the other hand, if they are not equal, a step 709 shift the output port O2 to a low level state. In this manner the sampling pulse $\phi 2$ can be generated when the count of the count area becomes equal to the phase difference data of the sampling pulse $\phi 2$.

The above-explained procedure is repeated in response to the entry of the clock pulse CLK to the interruption port INT to provide the sampling pulses φ1, φ2 of a phase difference corresponding to the image magnification.

Figure 15:
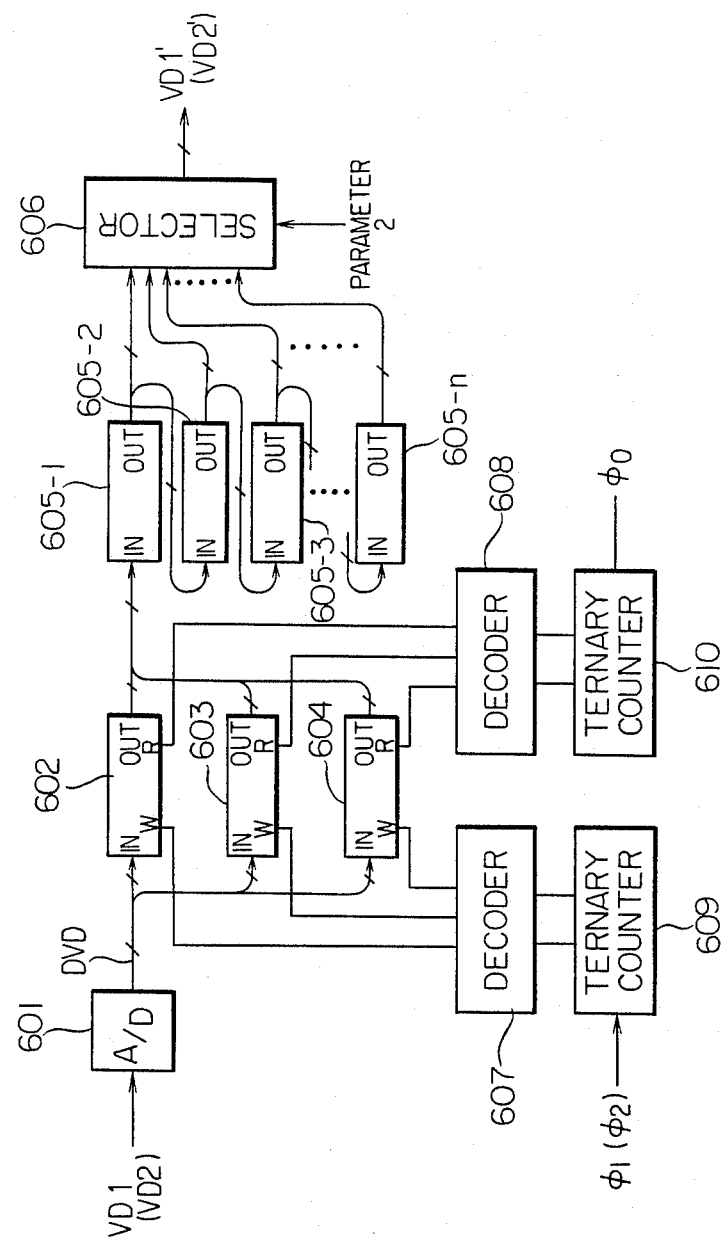
FIG. 15 is a circuit diagram showing an example of an A/D and sample delaying circuit.

FIG. 15 shows an example of the A/D and sample delay unit 103 shown in FIG. 8. The A/D and sample delay unit 104 can also have the same structure as shown in FIG. 15, and the corresponding numbers are primed in the following description.

In FIG. 15, an analog-to-digital (A/D) converter 601 converts analog image signals VD1 released from the image sensors 110 into digital signals DVD of a determined bit number. Line buffers 602-604 can each store image signals of a scan line, and have a memory capacity, in combination of ca. 3,000 pixels in the case that each line sensor has about 1,000 pixels.

Ternary counters 609, 610 respectively count the sampling pulses φ1 and the original pulses φ0. Decoders 607, 608 respectively decode the count of said ternary counters 609, 610. The output of said decoder 607 is supplied to write-in instruction terminals W of the buffer memories 602, 603 and 604, which are shifted to writing state in succession by said output signal. The output signal of the decoder 608 is supplied to read-out instruction terminals R of the buffer memories 602, 603 and 604, which are shifted to reading state in succession by said output signal. In this manner the digital image signals DVD from the A/D converter 601 are stored in a buffer memory selected by the output signal of the decoder 607, and are read from a buffer memory selected by the output signal of the decoder 608.

Figure 16:
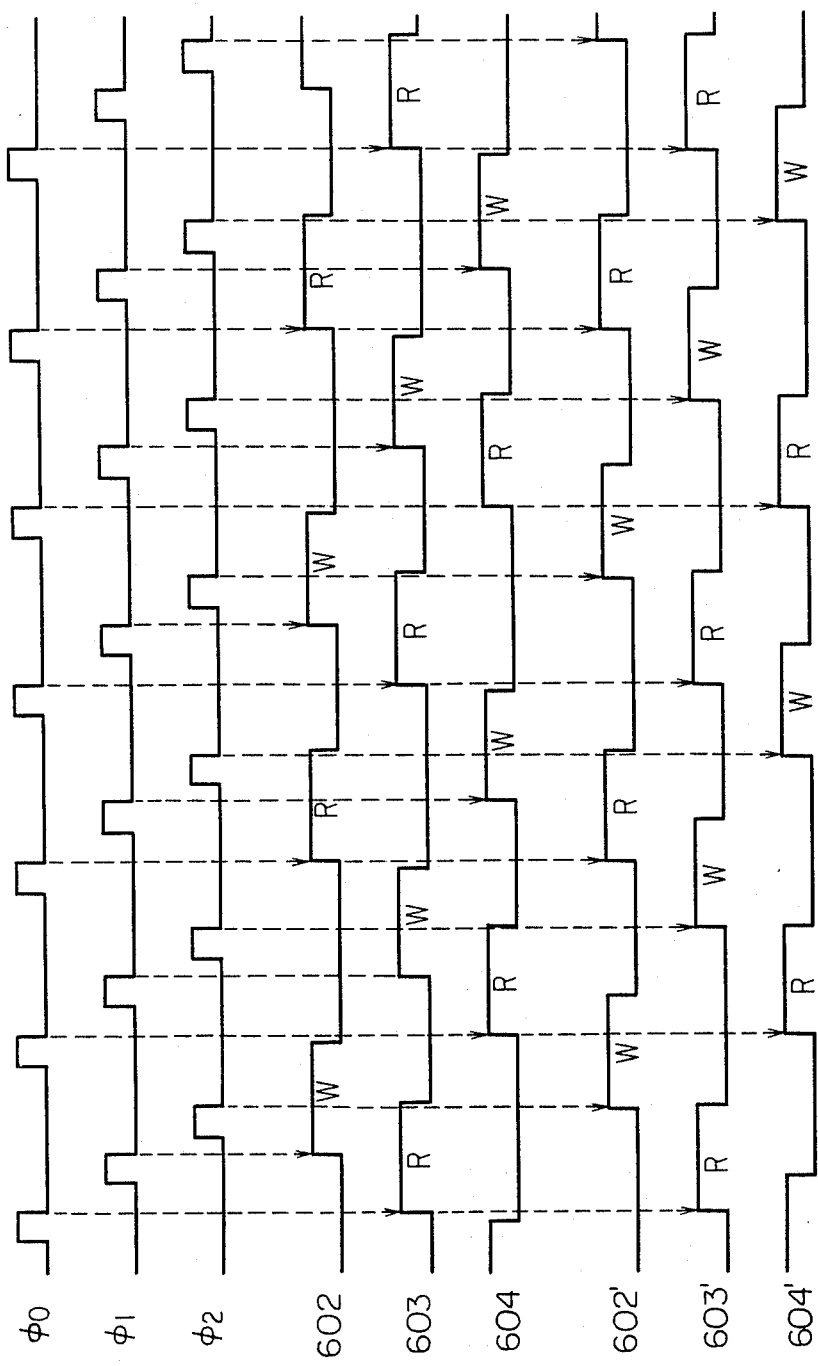
FIG. 16 is a timing chart showing the function of the circuit shown in FIG. 15.

FIG. 16 is a timing chart showing the write-in (W) operation and read-out (R) operation of the buffer memories 602, 603, 604 (602', 603', 604') according to the original pulses φ0 and sampling pulses φ1 (φ2). As will be apparent from FIG. 16, the image signals VD1, VD2 respectively supplied to the A/D and sample delay circuits 103, 104 are respectively stored in the buffer memories 602, 602' in synchronization with the sampling pulses φ1, φ2 of mutually different phases. On the other hand, the read-outs from the buffer memories 602, 602' are both conducted in synchronization with the original pulses φ0. In this manner the image signals entered with unmatched phases are matched in phase.

The image signals selectively read from the buffer memories 602, 603, 604 are supplied to an n-line buffer 605 composed of n line memories. Said n-line buffer 605 is provided with line memories 605-1-605-n each capable of storing image signals of a scan line, and serially connected in such a manner that the output of a line memory is connected to the input of a next line memory. However, it is also possible to employ line memories capable of providing image signals of plural pixels in parallel manner thereby achieving parallel shift.

The outputs of the line memories 605-1-605-n are respectively supplied also to a selector 606, which selects one of the entered image signals of plural series according to the parameter 2 and releases the image signals VD1' (VD2'). In this manner there can be corrected the aberration is the image reading positions of the first and second lines of image sensors.

It is also possible to dispense with the line memory 605 for the trailing image sensors and to delay the image signals of the leading image sensors only.

Figure 14:
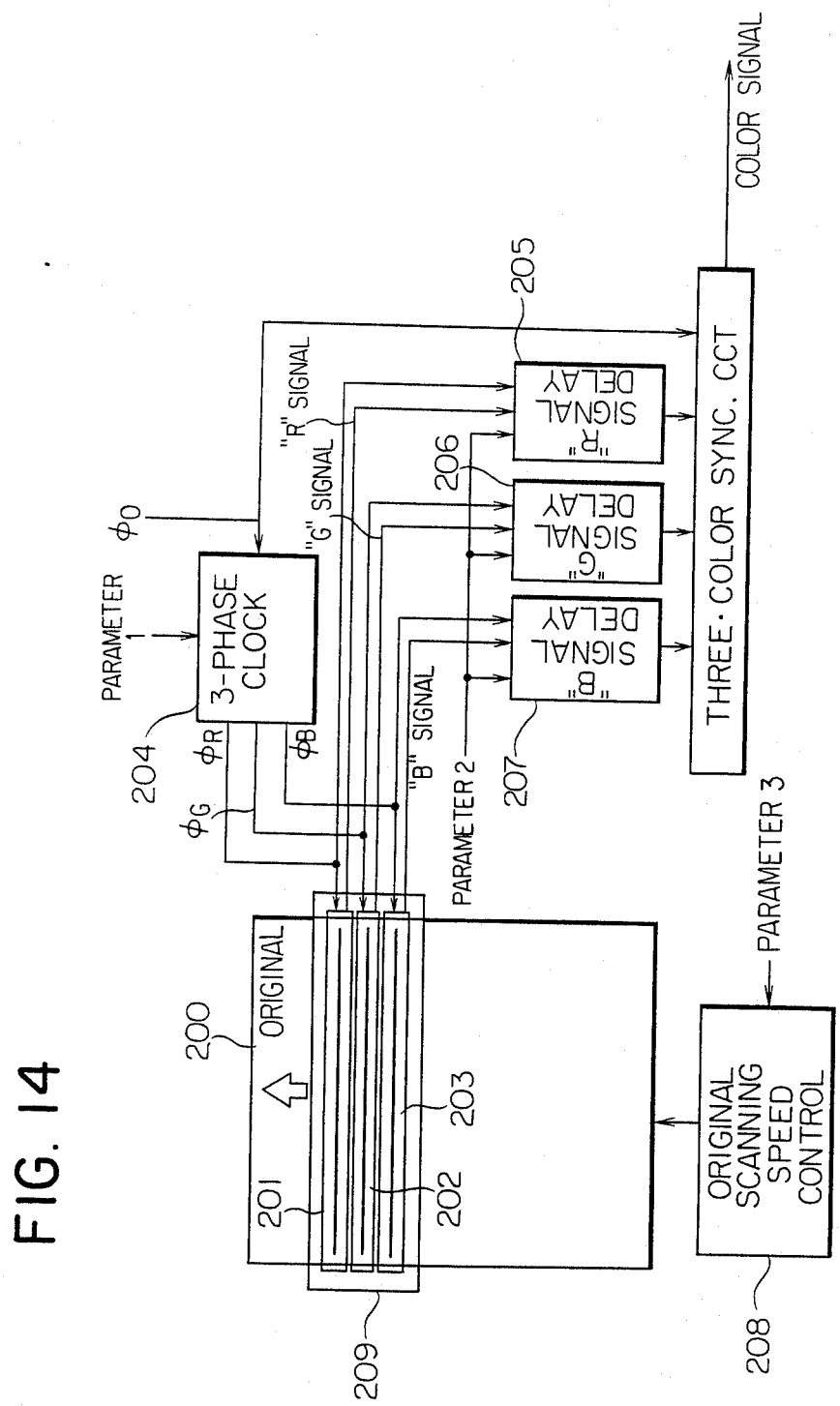
FIG. 14 is a block diagram showing another example of the reading control unit of the present invention.

FIG. 14 shows another embodiment of the present invention applied to a color image sensor device for obtaining R, G and B signals. In FIG. 14 there are shown an original 200; a linear imaging device 209 provided with three linear image sensors 201-203 arranged over the reading width of the original wherein 201 is a linear image sensor with a read-transmitting filter, 202 is a linear sensor with a green-transmitting filter and 203 is a linear sensor with a blue-transmitting filter; a 3-phase clock generator 204 for generating 3-phase clock pulses of a phase difference corresponding to the parameter 1 in the same manner as shown in FIG. 8; delay units 205, 206, 207 for delaying the R, G and B signals respectively according to the parameter 2; and an original scan speed control unit 208 for moving the linear imaging device 209 in the sub-scanning direction at a speed corresponding to the parameter 3. The present embodiment has an advantage of simultaneously supplying three color signals R, G, B by a three-color synchronizing circuit to a succeeding image processing device for color processing. Conventionally, three color signals can only be obtained with a sacrifice in the resolving power or serially, one color at each scanning line, but the present embodiment enables one to simultaneously obtain three color signals with a high resolving power.

In the foregoing description the plural image sensors are arranged in two or three lines, but the number of line sensors and the number of lines of arrangement thereof can be modified, and they need not be arranged at regular intervals. Also, in the foregoing description, the image sensors are arranged perpendicular to the scanning direction, but they can also be arranged with a certain angle other than ninety degrees to said direction. Furthermore, the sub-scanning can be achieved, instead of moving the image reading device, by fixing the same and advancing the original for example with rollers. In such case the advancing speed of the original is naturally varied according to the image magnification.

As explained in the foregoing, the limitation between the sampling interval, the sub-scanning speed and the distance of the arranged image sensor can be eliminated by a simple structure of independently controlling the timings of sampling of linear image sensors arranged with a certain distance in the sub-scanning direction.

Also control of the phase difference in the timing of sampling and of the sub-scanning direction enables to continuously modify the image magnification with a linear imaging device composed of a staggered arrangement of simply obtainable short image sensors, and to obtain a color image reading device capable of simultaneously obtaining color-separated signals by plural parallel image sensors with respectively different color filters and capable of continuously varying the image magnification.

As explained in the foregoing, it is rendered possible, with plural line image sensors arranged with a determined distance, to read an original image with an arbitrary image magnification.

What is claimed is:

1. An original reading apparatus comprising:
    a plurality of line sensors each comprising plural photosensor elements, said line sensors being arranged such that lines read at a given instant by adjacent ones of said line sensors mutually differ;
    moving means for causing relative movement of said plurality of line sensors and an original in a direction perpendicular to a scanning direction of said plurality of line sensors at a speed corresponding to a variable reading magnification of the original; and
    control means for independently controlling operation timings of adjacent ones of said line sensors in accordance with the reading magnification of the original.

2. An original reading apparatus according to claim 1, wherein said control means is adapted to control operation timings of adjacent ones of said line sensors with a time interval according to a reading magnification of the original.

3. An original reading apparatus according to claim 1, wherein said line sensors are arranged to read the same line of the original on a shared basis.

4. An original reading apparatus according to claim 1, further comprising means for delaying by a delay time an output from one of said line sensors which scans a line of the original prior to scanning of that line by a second one of said line sensors, said delay time being varied in accordance with the reading magnification of the original.

5. An original reading apparatus according to claim 1, wherein said plurality of line sensors are provided on a substrate.

6. An original reading apparatus according to claim 1, further comprising means for generating driving pulses for driving said plurality of line sensors, wherein said control means controls generation of timings of said driving pulses by said generating means.

7. An original reading apparatus comprising:
a plurality of line sensors each comprising a plurality of photosensor elements, said line sensors being arranged such that lines read at a given instant by said plurality of line sensors mutually differ;
moving means for causing relative movement of said plurality of line sensors and an original in a direction perpendicular to a scanning direction of said plurality of line sensors at a speed corresponding to a variable reading magnification of the original; and
control means for independently controlling operation timings of said plurality of line sensors in accordance with the reading magnification of the original.

8. An original reading apparatus according to claim 7, wherein said control means is adapted to control operation timings of said line sensors with a time interval according to a reading magnification of the original.

9. An original reading apparatus according to claim 7, wherein said line sensors are provided with respectively different color filters.

10. An original reading apparatus according to claim 7, further comprising means for delaying by a delay time an output from one of said line sensors which scans a line of the original prior to scanning of that line by a second one of said line sensors, said delay time being varied in accordance with the reading magnification of the original.

11. An original reading apparatus according to claim 7, further comprising means for generating driving pulses for driving said plurality of line sensors, wherein said control means controls generation of timings of said driving pulses by said generating means.

12. A color original reading apparatus comprising:
a plurality of line sensors each comprising a plurality of photosensor elements, said line sensors being arranged such that lines read at a given instant by said plurality of line sensors mutually differ and being provided with respectively different color filters;
moving means for causing relative movement of said plurality of line sensors and a color original in a direction perpendicular to a scanning direction of said plurality of line sensors at a speed corresponding to a variable reading magnification of the color original; and
control means for independently controlling operation timings of said plurality of line sensors in accordance with the reading magnification of the color original.

13. A color original reading apparatus according to claim 12, wherein said control means is adapted to control operation timings of said line sensors according to a reading magnification of the color original.

14. A color original reading apparatus according to claim 12, further comprising means for delaying by a delay time an output from one of said line sensors which scans a line of the color original prior to scanning of that line by a second one of said line sensors, said delay time being varied in accordance with the reading magnification of the color original.

15. A color original reading apparatus according to claim 12, further comprising means for generating driving pulses for driving said plurality of line sensors, wherein said control means controls generation of timings of said driving pulses by said generating means.

* * * * *

UNITED STATES PATENT AND TRADEMARK OFFICE
CERTIFICATE OF CORRECTION

PATENT NO. : 4,750,048  
DATED : June 7, 1988  
INVENTOR(S) : MAMORU SATOH, ET AL.

Page 1 of 2

It is certified that error appears in the above-identified patent and that said Letters Patent is hereby corrected as shown below:

AT [56] IN REFERENCES CITED

U.S. Patent Documents, "Cream et al." should read --Crean et al.--.

AT [57] IN THE ABSTRACT

Line 5, "sub scanning" should read --sub-scanning--.

COLUMN 1

Line 50, "of" (first occurrence) should be deleted.
Line 50, "subs-scanning" should read --sub-scanning--.

COLUMN 3

Line 21, "motor 125" should read --motor 135--.

COLUMN 4

Line 17, "not explained" should read --not be explained--.
Line 31, "differece" should read --difference--.

COLUMN 6

Line 6, "setting" should read --setter--.
Line 15, "conincides" should read --coincides--.
Line 62, "shift" should read --shifts--.

UNITED STATES PATENT AND TRADEMARK OFFICE
CERTIFICATE OF CORRECTION

PATENT NO. : 4,750,048

DATED : June 7, 1988

INVENTOR(S) : MAMORU SATOH, ET AL.

Page 2 of 2

It is certified that error appears in the above-identified patent and that said Letters Patent is hereby corrected as shown below:

COLUMN 7

Line 59, "is" should read --in--.

COLUMN 8

Line 2, "read-transmitting" should read --red-transmitting--.
Line 15, "to" should read --over--.
Line 36, "sensor" should read --sensors--.
Line 41, "enables to" should read --enables one to--.
Line 44, "simply" should read --easily--.

Signed and Sealed this

Seventeenth Day of January, 1989

Attest:

DONALD J. QUIGG

Attesting Officer

Commissioner of Patents and Trademarks